US012789596B2

(12) United States Patent
Sander

(10) Patent No.: US 12,789,596 B2
(45) Date of Patent: Nov. 10, 2026

(54) COMPONENT PROVIDED FOR ENERGY ABSORPTION

(71) Applicant: Brose Fahrzeugteile SE & Co. Kommanditgesellschaft, Coburg, Coburg (DE)

(72) Inventor: Jan Sander, Meeder (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 991 days.

(21) Appl. No.: 17/464,052

(22) Filed: Sep. 1, 2021

(65) Prior Publication Data

US 2022/0097499 A1 Mar. 31, 2022

(30) Foreign Application Priority Data

Sep. 25, 2020 (DE) ..................... 10 2020 212 131.1

(51) Int. Cl.
*B60J 5/04* (2006.01)
*B60N 2/427* (2006.01)

(52) U.S. Cl.
CPC ........ *B60J 5/0461* (2013.01); *B60N 2/42709* (2013.01)

(58) Field of Classification Search
CPC ...................................................... B60J 5/0461
See application file for complete search history.

(56) References Cited

U.S. PATENT DOCUMENTS 6,472,043 B1 10/2002 Kobayashi et al.
2005/0067152 A1 3/2005 Huang
2005/0248180 A1 11/2005 Campo Barasoain et al.
2007/0227707 A1 10/2007 Baugh
2011/0101714 A1 5/2011 Bator
2018/0066569 A1 3/2018 Shi et al.
2018/0184732 A1 7/2018 Plant
2018/0265023 A1* 9/2018 Faruque .................. F16F 7/121
2020/0108870 A1 4/2020 Cho et al.
2021/0039717 A1 2/2021 Matsuoka et al.

FOREIGN PATENT DOCUMENTS

CH 516130 A 11/1971
CN 1477258 A 2/2004
CN 1693730 A 11/2005
CN 107791826 A 3/2018
CN 111002932 A 4/2020
(Continued)

OTHER PUBLICATIONS

Chinese Office Action for Application No. 202180073004.0, English Translation attached to original, Dated Jun. 23, 2025, All together 14 Pages.

(Continued)

*Primary Examiner* — Melody M Burch
(74) *Attorney, Agent, or Firm* — Dickinson Wright PLLC

(57) ABSTRACT

A component that is provided for energy absorption in the event of a force acting on the component. The component is configured with a component structure integrating at least one first energy absorption mechanism and at least one second energy absorption mechanism, by means of which the first and second energy absorption mechanisms can be activated in the event of a force acting on the component and exceeding a threshold value.

13 Claims, 8 Drawing Sheets

(56) References Cited

FOREIGN PATENT DOCUMENTS

| | | | | |
|---|---|---|---|---|
| DE | 436155 | C | 3/1927 | |
| DE | 509314 | C | 10/1930 | |
| DE | 1686460 | U | 11/1954 | |
| DE | 3427161 | A1 | 1/1985 | |
| DE | 4142023 | A1 | 6/1993 | |
| DE | 19615875 | A1 | 10/1997 | |
| DE | 19910312 | A1 | 11/2000 | |
| DE | 102004016344 | A1 | 10/2004 | |
| DE | 102004035741 | A1 | 3/2005 | |
| DE | 102005050963 | A1 * | 4/2007 | ............. B22D 19/04 |
| DE | 102010024733 | A1 | 12/2011 | |
| DE | 102010027053 | A1 | 1/2012 | |
| DE | 102010046471 | A1 | 3/2012 | |
| DE | 102012202883 | A1 | 8/2013 | |
| DE | 202017100043 | U1 | 1/2017 | |
| DE | 102016105645 | A1 | 9/2017 | |
| DE | 102018106007 | A1 | 9/2018 | |
| DE | 102018120660 | A1 | 2/2019 | |
| DE | 102018009432 | A1 | 5/2019 | |
| DE | 102018124192 | A1 | 5/2019 | |
| DE | 112018002969 | T5 | 2/2020 | |
| DE | 102019128941 | A1 | 4/2021 | |
| EP | 0861151 | B1 | 6/2003 | |
| EP | 1391550 | A1 | 2/2004 | |
| EP | 1541424 | B1 | 1/2008 | |
| FR | 2774144 | A1 | 7/1999 | |
| GB | 2323146 | A | 9/1998 | |
| JP | H1086771 | A * | 4/1998 | |
| JP | 2002349619 | A * | 12/2002 | |
| JP | 2008069756 | A | 3/2008 | |
| JP | 2010006245 | A | 1/2010 | |
| JP | 2010038340 | A | 2/2010 | |
| JP | 2018100616 | A | 6/2018 | |
| KR | 20070064958 | A | 6/2007 | |
| WO | 2005028849 | A1 | 3/2005 | |
| WO | 2007009142 | A1 | 1/2007 | |
| WO | WO-2009098971 | A1 * | 8/2009 | ............ B60J 5/0441 |
| WO | 2011003444 | A1 | 1/2011 | |
| WO | 2013124096 | A1 | 8/2013 | |
| WO | WO2019181434 | A | 4/2020 | |

OTHER PUBLICATIONS

Chinese Office Action for Application No. 202110884719.6, English Translation attached to original, Dated Nov. 1, 2025, All together 13 Pages.

Chinese Office Action for Application No. 202111113040.3, English Translation attached to original, Dated Jun. 27, 2025, All together 12 Pages.

Zhao Yang et al., "Analysis on energy absorption of front rail structure in the course of collision." English Abstract on first page, Journal of Heilongjiang Institute of Technology Dec 2008, vol. 22, No. 4, 5 Pages.

* cited by examiner

COMPONENT PROVIDED FOR ENERGY ABSORPTION

CROSS-REFERENCE TO RELATED APPLICATIONS

This application claims priority to German Patent Application No. DE 10 2020 212 131.1, filed on Sep. 25, 2020, the disclosure of which is hereby incorporated in its entirety by reference herein.

TECHNICAL FIELD

The present disclosure relates to a component for energy absorption in the event of a force acting on the component.

BACKGROUND

Components for the absorption of energy that originates from a force applied onto the component from outside are widely known, for example as so-called crash absorbers in the automotive sector. Typically, such components rely on a single energy absorption mechanism in order to absorb energy. Examples include for example foamed component structures, additively manufactured lattice structures or compression tubes. Such components are each configured for energy absorption by plastic deformation. In the previously known components, the possibility of absorbing energy is limited due to the respectively utilized energy absorption mechanism. Moreover, the design of corresponding components in part is difficult, as the deformation behavior is difficult to foresee under certain circumstances and the respective structures in part react very sensitively to fluctuations in the material properties.

SUMMARY

Hence, it is the object underlying the proposed solution to provide an improvement in this respect.

In one or more embodiments, a component configured with a component structure that integrates at least one first energy absorption mechanism and at least one second energy absorption mechanism (different from the first energy absorption mechanism) is provided.

Thus, the present disclosure describes a component with a component structure into which two different energy absorption mechanisms are integrated, i.e. energy absorption mechanisms based for example on different action principles, and which on the basis of at least one threshold value for at least one force acting on the component (and specified as regards a direction of action) is configured in such a way that the at least two different energy absorption mechanisms become active at the same time or in time succession. Thus, at least two different energy absorption mechanisms are provided, which are directly integrated into the component structure. At least one of the energy absorption mechanisms can be based on an action principle that utilizes plastic deformation, shear, fracture, entanglement or friction for energy absorption. By providing different energy absorption mechanisms possibly based on different action principles, which each are an integral part of the component structure forming the component, the respective component not only is more specifically adapted to different utilization and failure scenarios. Rather, a larger energy absorption capacity can also be realized with identical dimensions of the component.

In one or more embodiments, the first and second energy absorption mechanisms can be activated sequentially in time by using the component structure integrating the at least two different energy absorption mechanisms so that one part of the energy introduced into the component via the acting force is absorbed via the first energy absorption mechanism before the at least one second energy absorption mechanism is activated. The energy absorption mechanisms may be consequently are interlinked within the component structure in such a way that they are activated in time succession—with unchanged application of force. Furthermore, this includes the possibility that the at least two different energy absorption mechanisms nevertheless can still partially proceed at the same time after a temporally staggered activation. For example, the first energy absorption mechanism becomes active due to the force exceeding the threshold value and acting on the component and results in a plastic deformation of at least one portion of the component structure, as a result of which the at least one further, second energy absorption mechanism is activated, while the energy absorption mechanism via the plastic deformation continues.

As an example, an activation of at least one of the first and second energy absorption mechanisms can require a plastic deformation of at least one portion of the component structure. Consequently, at least one of the first and second energy absorption mechanisms integrated into the component structure here is configured and formed to be activated by plastic deformation of at least one portion of the component.

For example, this means that at least one of the first and second energy absorption mechanisms defines (predetermined) breaking points within the component structure for one fracture or several fractures, in particular one shear fracture or several shear fractures. Corresponding breaking points then are part of the respective energy absorption mechanism which in the event of a force acting on the component and exceeding the threshold value absorbs energy by at least one fracture that appears at one or more breaking points predefined therefor. A breaking point for example is defined by a region of weakness in the component structure, in which a material thickness is locally reduced, or by a specifically locally increased inherent tension in the component structure.

For example, at least one breaking point is provided on an area of the component structure bordering at least one cutout in the component structure. Via the at least one cutout and its bordering it is possible to not only control the appearance, but also the propagation of a crack as a result of a fracture, e.g. a shear fracture, specifically in dependence on an applied force.

In one design variant, a bordering area on which at least one breaking point is provided, is present between two cutouts in the component structure so that in the event of a force exceeding the threshold value and acting on the component a fracture produced at the at least one breaking point propagates between the two cutouts and hence finally extends between the two cutouts and in this way leads to a connection of the two cutouts. Due to a fracture appearing along the provided breaking point(s) and guided thereby, for example an at least local destruction of a partition wall provided between the two cutouts in the component structure will occur.

For example, cutouts provided in the component structure for the control of energy absorption are formed elliptical in cross-section, in particular circular, hexagonal, in particular honeycomb-shaped or octagonal. A specific course of a fracture, in particular shear fracture, and of a resulting crack in the component structure, which is caused as a result of the force acting on the component and is specifically permitted for energy absorption, is achieved via the geometry and size of the respective cutouts.

In one exemplary embodiment, one of the first and second energy absorption mechanisms comprises an interface within the component structure for an energy-absorbing positive and/or non-positive connection when a force exceeding the threshold value is applied onto the component. Hence, in connection with such an exemplary embodiment at least one of the first and second energy absorption mechanisms provides the provision of a positive and/or non-positive connection within the component structure, which is obtained within the component only due to the force exceeding the threshold value and acting on the component. This for example includes the fact that areas within the component structure are brought in contact with each other only due to the force, in order to provide an additional resistance to the force acting on the component and thereby absorb (additional) energy.

For example, the second energy absorption mechanism comprises the interface and the first energy absorption mechanism defines at least one first contact area to be brought in contact with the interface at least partially by positive and/or non-positive engagement, when a force exceeding the threshold value is applied onto the component. In particular, it can be provided in this connection, as explained above, that initially the first energy absorption mechanism becomes active as a result of the force acting on the component, before the second energy absorption mechanism becomes active. In this way, for example, an energy absorption via the first energy absorption mechanism can require a plastic deformation of at least one portion of the component, as a result of which the first contact area of the interface is approached for the positive and/or non-positive connection.

For example, the interface is formed by at least one second contact area recessed with respect to an adjacent area of the component structure, in which at least part of the first contact area can engage in the event of a force exceeding the threshold value and acting on the component and by plastic deformation of at least one portion of the component. For example, the first contact area of the first energy absorption mechanism includes at least one of the breaking points for the shear fracture. This for example allows that in the event of a force exceeding the threshold value and acting on the component, at least one shear fracture appears or is specifically permitted on the first contact area in order to then positively and/or non-positively bring a part of the first contact area, which is locally displaceable due to the shear fracture, into engagement with the interface of the second contact area, in order to thereby activate the second energy absorption mechanism and absorb additional energy. The first contact area in the component structure then is configured and dimensioned in such a way that in the event of a force exceeding the threshold value and acting on the component, at least one (shear) fracture surface appears on the first contact area and a shear fracture surface is obtained, which protrudes from the adjacent second contact area. With continued application of force onto the component, this shear fracture surface can be positively and/or non-positively brought in contact with the second contact area. Thus, via the design and dimensioning of the first contact area in the component structure, an energy absorption is permitted, which for example is specifically provided subsequent to a plastic deformation of the component or accompanies the same. As a result of the force acting on the component, at least one positive and/or non-positive connection subsequently is produced within the component structure, which provides a contribution to an energy absorption.

For example, the second contact area comprises a shell surface of a cutout provided in the component structure, on whose adjacent area the breaking point for a fracture is provided. In the case of a shear fracture in the second contact area at least one shear fracture surface is obtained, which is approached to a shell surface of a cutout in the component structure already present previously and here is positively and/or non-positively brought in contact with the shell surface in order to thereby additionally absorb energy.

For example, the first contact area is formed by a partition wall between two cutouts, which with a wall length extends along a spatial direction. The wall length of this partition wall then is smaller than a cutout length with which each of the two cutouts extends along the same spatial direction. Thus, a length of a shear surface obtained by shear fracture on the partition wall in any case is smaller than the cutout length so that with an active energy absorption mechanism the sheared-off part of the (broken) partition wall in any case can dip into an adjacent cutout in order to produce an additional energy-absorbing positive and/or non-positive connection. Friction losses obtained by a non-positive connection or increased resistance forces obtained by a positive connection, in particular an entanglement, counteract a further plastic deformation and thus serve the additional absorption of energy.

In one design variant, the component structure is of lattice-shaped design. In particular in such a lattice-shaped component structure, the above-mentioned design variants of first and second energy absorption mechanisms can be integrated effectively. A cutout then is defined for example by an (elementary) cell within the lattice, which is separated from further elementary cells of the lattice-shaped component structure by circumferential webs.

For example, the lattice-shaped component structure extends along three mutually perpendicular spatial directions, wherein in two mutually perpendicular cross-sectional views a lattice structure is each formed with cutouts arranged in a pattern. The cutouts of two cross-sectional views here are different in one design variant. The different patterns of the two mutually perpendicular cross-sectional views can be visible in particular in two side views of the component, which are obtained along two mutually perpendicular directions of view onto the component. When the three spatial directions are designated with x, y and z corresponding to a Cartesian coordinate system, different patterns are provided for the lattice structure(s) for example in an xz-plane and in a yz-plane.

The cutouts of two cross-sectional views can also differ from each other in terms of their dimensions and/or in terms of their respective geometric shape. When the cutouts are different from each other merely in terms of their dimensions, and hence in particular in terms of their circumference and/or their cross-sectional area, they can furthermore have the same geometry and hence be similar in a geometric sense. With cutouts different from each other in terms of their respective geometric shape, the shapes of the cutouts are geometrically dissimilar to each other. For example, cutouts shown in a first cross-sectional view each are hexagonal, and cutouts shown in a second cross-sectional view perpendicular to the first cross-sectional view each are octagonal (and hence geometrically dissimilar to the cutouts of the first cross-sectional view).

With regard to the control of one or more shear fractures and hence of the formation and propagation of a crack within the component structure one design variant can provide that in a cross-sectional view four cutouts distributed around a support portion of the lattice-shaped component structure are present in the component, wherein the support portion is located at a crossing point of partition walls bordering the cutouts. The support portion here has a greater moment of resistance than each of the four partition walls. Thus, the support portion located in the crossing point is designed/formed and dimensioned with a greater moment of resistance so that in the case of the force exceeding a threshold value and acting on the component, a fracture, e.g. a shear fracture, for example, appears on the partition walls, but not on the support portion.

With regard to an improved modeling and (e.g. additive) manufacture of a lattice-shaped component structure, one design variant provides that the lattice-shaped component structure is based on at least one lattice that is made up of identical elementary cells. In the elementary cells, the geometry, dimensions, thickness of webs each bordering an elementary cell and/or the volumetric filling ratio are specified on the basis of a predefined reference cell, namely in dependence on an intended use, a portion of the component to be formed with the component structure and/or forces acting on the component in a properly constructed state. Thus, a starting point for a lattice (possibly of a plurality of different lattices), which defines the lattice-shaped component structure, is a predefined reference cell that is varied in dependence on particular component parameters in order to specify the shape of the elementary cell for the lattice used. In this way, a lattice-shaped component structure can easily be developed on the basis of a defined reference cell in a computer-aided and at least partially automated way by merely specifying the corresponding component parameters.

As an example, there can be provided a first portion of the component, in which a lattice structure is formed with a first lattice, while a second portion of the component integrally formed therewith is configured with a lattice structure that is based on a different, second lattice. Thus, the component here integrates two different lattice structures. The lattice structures can each be formed with elementary cells originating from a particular reference cell. In this way, the component can be designed comparatively easily with different lattice structures in a computer-aided way, in that ultimately an elementary cell is calculated by merely using the one reference cell in dependence on component parameters to be specified, and a lattice structure is specified therefrom for the respective portion. This may include the fact that different zones with different energy absorption capacity are formed on the component due to differently designed lattice structures.

For example, a first portion of the component is designed for a load occurring locally on the component, which differs from a load for which the second portion having a differently formed lattice structure is designed. As an example, the first portion can be designed for the absorption of an amount of (crash) energy which by at least one order of magnitude differs from an amount of energy for whose absorption the second portion having the differently formed lattice is designed.

A proposed component provided for energy absorption can be provided for use in a vehicle, and for example, in a crash-relevant area. This for example includes an assembly for a vehicle interior space, here in particular a component of a vehicle seat. Components provided for the interior space and formed with a design variant of a proposed component furthermore can also be console elements and for example tables, screen holders, footrests or folding-top parts. As an example, a vehicle door can also be configured with a design variant of a proposed component. In particular, the component can be provided in a vehicle as a so-called crash absorber, e.g. can be provided on a front-side, rear-side, door-side, seat-side or A-, B- or C-pillar-side crash absorber or form the same.

Regardless of the use in a vehicle, the energy-absorbing component can also be employed for armored structures, for example in an armor plate back structure, as an impact absorber in machines, in particular machine tools, or in protective equipment for a person, including a helmet, a protector or shoe caps. Here as well, distinct advantages can be achieved by means of the proposed solution, which via at least two different energy absorption mechanisms integrated into the component structure leads to a higher energy absorption per volume or weight of a component, and for example can lead to a smaller size, a smaller weight, a higher comfort and a higher safety.

BRIEF DESCRIPTION OF THE DRAWINGS

The attached Figures by way of example illustrate possible design variants of the proposed solution.

In the drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1A to 1F schematically show a design variant of a proposed component 1 that is loaded with a force F. In the present case, the force F by way of example is a bending force that leads to a moment on the component 1 around a bearing point L at which the component 1 is fixed. The component 1 for example can be a component for a vehicle, for example for a vehicle seat, and form a crash absorber. Such crash absorbers are designed in particular for occurring crash cases and associated excessive loads in order to specifically absorb (crash) energy. In the present case, the component 1 therefore integrates several (at least two) energy absorption mechanisms based on different action principles, which can be activated in the event of the force F acting on the component 1 and exceeding a threshold value and only permit failure of the component 1 when the component 1 has absorbed a comparatively large amount of energy.

In the present case, the component 1 therefor is configured with a lattice-shaped component structure 10 and extends along three mutually perpendicular spatial directions x, y and z. Due to the lattice-shaped component structure 10 of the component 1, a lattice structure formed of a pattern of cutouts 11, 12 or 13 uniformly distributed here is formed in each of three mutually perpendicular cross-sectional views, i.e. in an xy-plane, an xz-plane and a yz-plane. The lattice-shaped component structure 10 with the cutouts 11, 12 and 13, which in FIGS. 1A to 1F by way of example each are elliptical in cross-section, is shaped and dimensioned such that in the event of the force F exceeding the threshold value and acting on the component 1, for example as a result of a crash, interlinked, temporally successive energy absorption mechanisms are activated within the lattice-shaped component structure 10 in order to absorb at least part of the (crash) energy introduced into the component 1 by the force F.

Figure 1A:
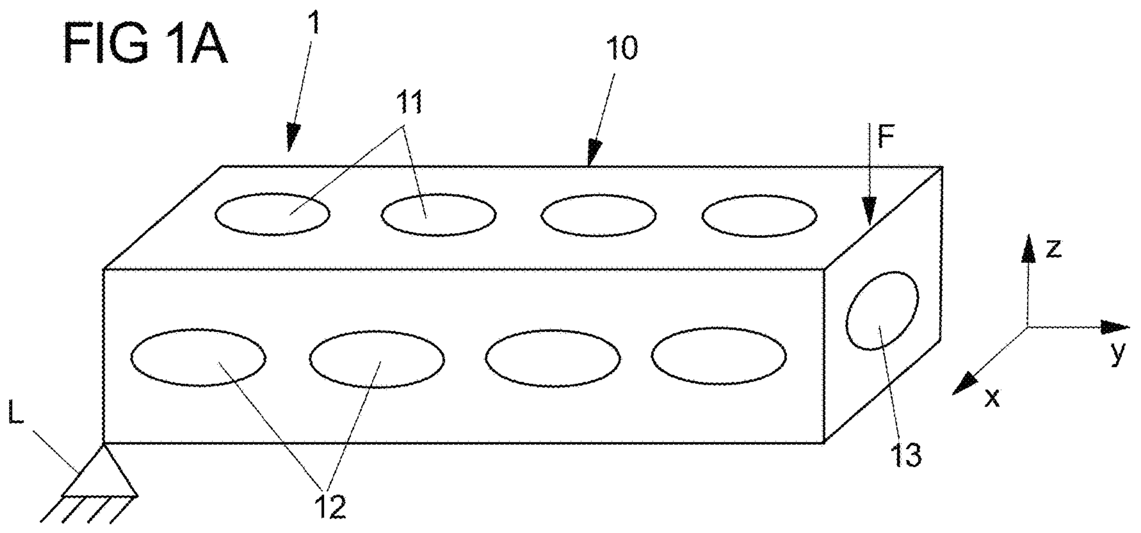
FIGS. 1A-1F show a design variant of a proposed component loaded in the event of a force exceeding a threshold value, which acts on the component as a bending force and leads to the activation of different energy absorption mechanisms within the component, before failure of the component occurs.
Figure 1B:
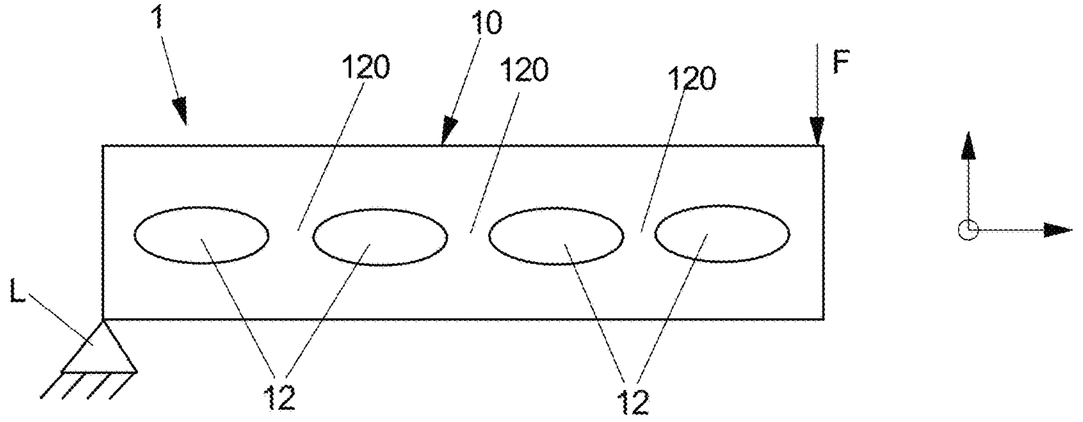
Figure 1C:
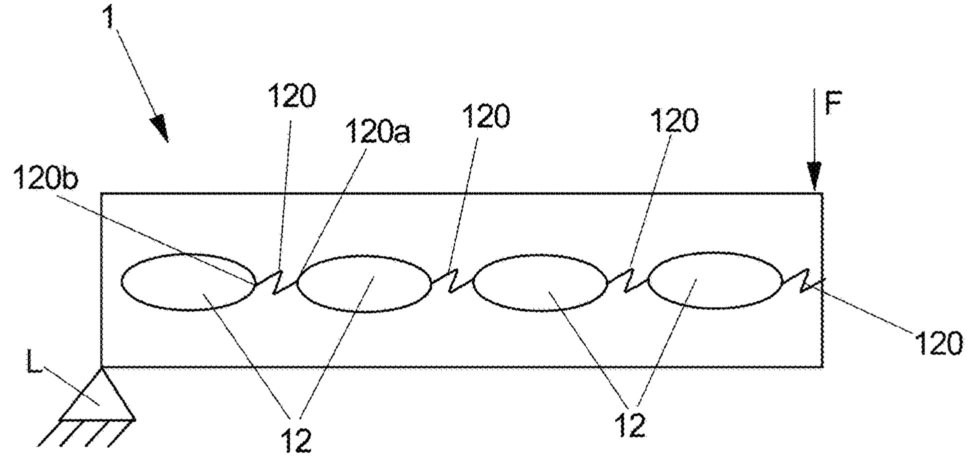
Figure 1D:
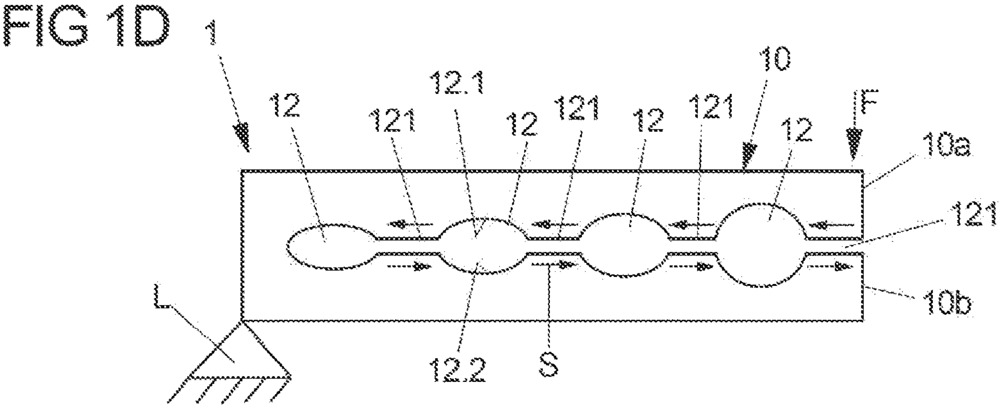
Figure 1E:
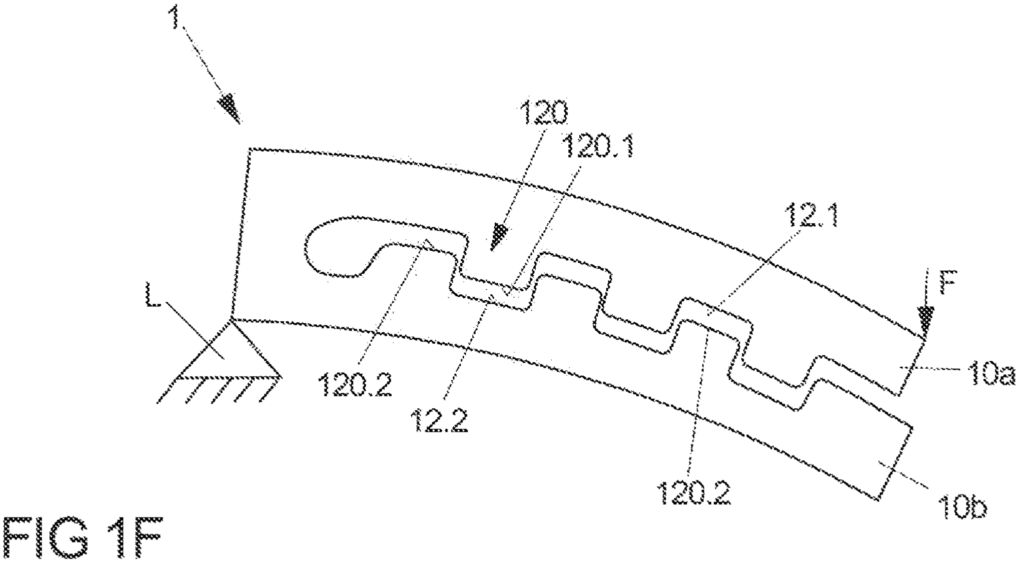

In the illustrated design variant, the force F in FIG. 1A acts along the direction −z and due to its height exceeding the threshold value initially leads to a plastic deformation of the component 1, by which part of the energy is absorbed already. The cutouts 12 visible in a cross-sectional view along the yz-plane are dimensioned and separated from each other in the y-direction via partition walls 120 acting as first contact areas in such a way that in the area along the shell surface of the cutouts 12 located in the y-direction the largest inherent tensions are present and hence (predetermined) breaking points 120*a*, 120*b* are defined. Under the applied force F and shear forces resulting therefrom cracks are formed at these breaking points, which then grow towards a respectively adjacent cutout 12 and hence primarily in the direction y or −y (cf. FIG. 1B). Due to the dimensioning of the lattice-shaped component structure 10, breaking points 120*a*, 120*b* thus are specifically provided in the vicinity of the partition walls 120, along which a crack starts to form due to the force F (FIG. 1C), which with a continued force F leads to shear bridges 121 of the partition walls 120 due to resulting shear forces (FIG. 1D).

A first energy absorption mechanism of the component F thus is formed by the combination of the cutouts 12 and partition walls 120 and the breaking points 120*a* and 120*b* provided on the same. As a result of the force F exceeding the threshold value and acting on the component 1, this combination and corresponding design of the lattice-shaped component structure 10 permits a plastic deformation of the component 1 not only for energy absorption. Rather, the occurring plastic deformation of the component 1 also is utilized for activating the first energy absorption mechanism based on another action principle, for which a formation of shear fractures 121 is decisive in order to absorb energy in the component 1, without the component 1 failing completely.

A second energy absorption mechanism is connected in series with the first energy absorption mechanism of the component 1. This second energy absorption mechanism utilizes the shear surfaces 120.1 and 120.2 formed by a shear fracture 121 on an original partition wall 120 (cf. FIGS. 1D and 1E) for providing a positive and/or non-positive connection additionally absorbing energy within the component structure 10. In addition to a partition wall 120 acting as a first contact area, two second contact areas 12.1 and 12.2 form part of the second energy absorption mechanism, which are formed by shell surfaces of an adjacent cutout 12. Each part of a shell surface of a cutout 12, which adjoins a resulting shear surface 120.1 or 120.2 along the spatial direction y, acts as a second contact area 12.1 and 12.2 of the second energy absorption mechanism, with which an opposite adjacent shear surface 120.1, 120.2 can be brought in contact by positive and/or non-positive engagement, when the component 1 continues to be loaded with the (bending) force F. Thus, two structural parts 10*a* and 10*b* shearing off on each other are formed within the component structure 10 due to the shear fractures 121. Consequently, the shear fractures 121 lead to the connection of individual cutouts 12 to each other. When the resulting structural parts 10*a*, 10*b* continue to shear off, the structural parts 10*a*, 10*b* can get entangled with each other upon displacement relative to each other. The parts of the original partition wall 120 having the shear surfaces 120.1, 120.2 then alternately dip into the recessed areas of the cutouts 12 and form a positive and/or non-positive connection which provides an additional force of resistance to the force F. Furthermore, cutouts 12 and partition walls 120 in the lattice-shaped component structure 10 can also be dimensioned in such a way that with a persistently applied force F—and an associated further shearing of the structural parts 10*a* and 10*b*—skipping occurs of the tooth-like protruding parts of the (broken/cracked) partition walls 120 forming the shear surfaces 120.1 and 120.2 into recessed areas of the original cutouts 12 adjacent along the y-direction.

Figure 1F:
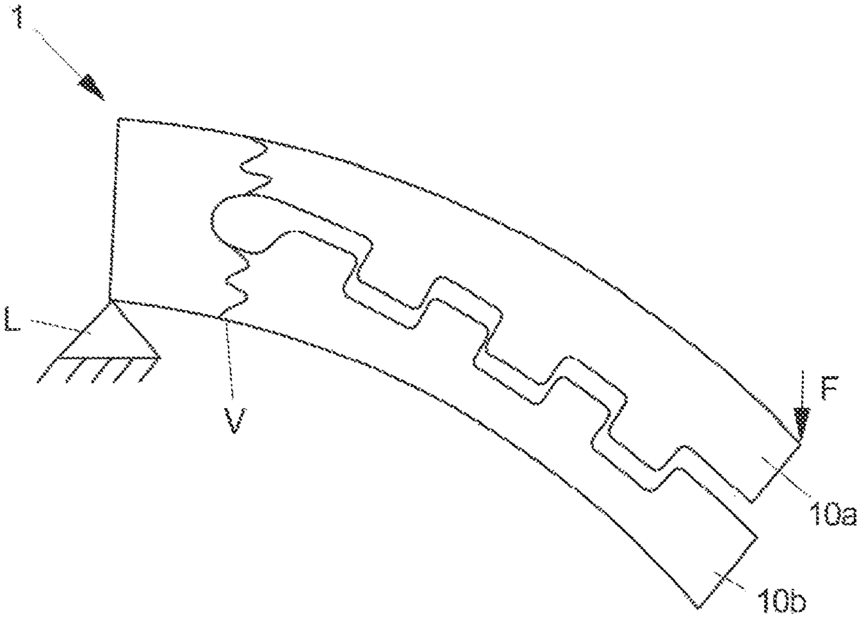

Only after no more energy can be absorbed by the second energy absorption mechanism, which is provided downstream and thus connected in series with the first energy absorption mechanism, and thus the force F on the component 1 continues to be maintained, does the component 1 fail via a failure crack V in an area close to the bearing corresponding to FIG. 1F.

Due to the design of the component structure 11 a plurality of energy absorption mechanisms are connected in series, whereby the effectivity for an absorption of a force F applied from outside has increased significantly as compared to conventional component structures. In the design of the (lattice-shaped) component structure 10, different failure stages can be predetermined and be controlled specifically, and in particular the component structure 1 can be designed specifically for different load directions.

Figure 2A:
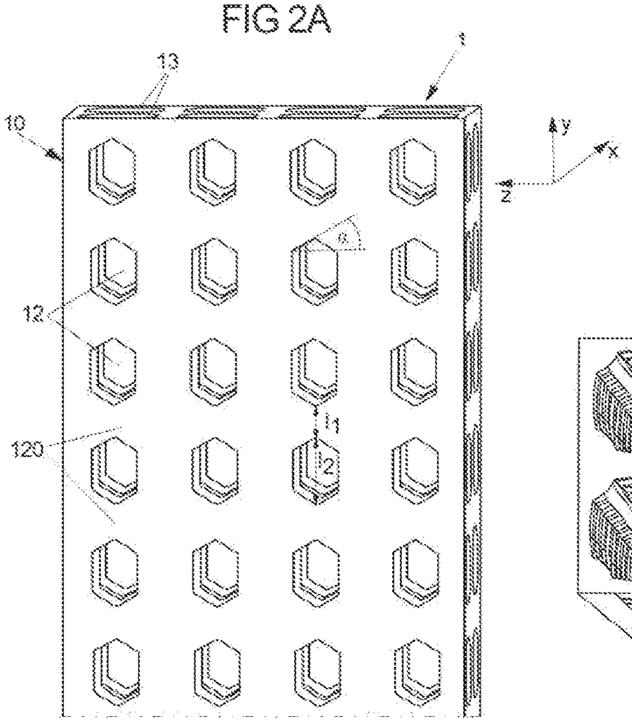
FIGS. 2A-2B show different views of a development of the component of FIGS. 1A to 1F with differently designed lattice-shaped component structures.
Figure 2B:
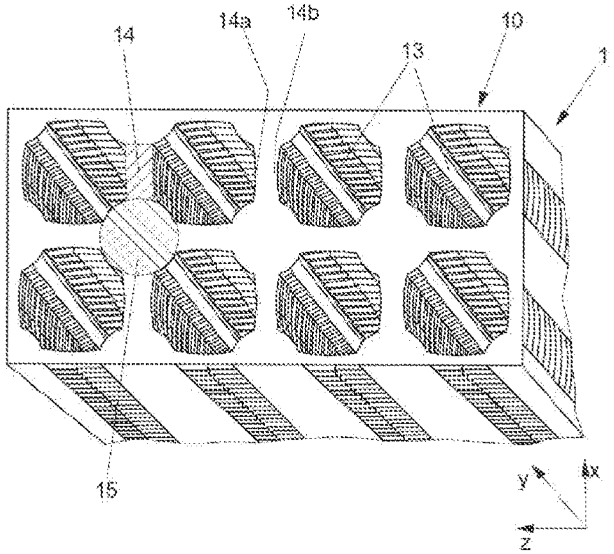

FIGS. 2A and 2B show further details of a lattice-shaped component structure 10 for a component 1 of FIGS. 1A to 1F. FIGS. 2A and 2B in particular show different patterns for lattices underlying the component structure 10 in mutually perpendicular cross-sectional views. While the cutouts 12 each are of hexagonal shape in the yz-plane, the cutouts 13 which in a top view are disposed along the y or −y direction and hence lie in an xz-plane each are geometrically dissimilar and octagonal. Moreover, the thicknesses of the (web-shaped) partition walls 120 or 14 located between the individual cutouts 12 and 13 also are different.

The different geometrical configuration of the lattice-shaped component structure 10 in the different mutually perpendicular cross-sectional views in particular results from the integration of the different energy absorption mechanisms into the component structure 10, which is useful to specifically control the plastic deformations obtained under a load that is caused by a force applied onto the component 1 from outside, and to control the shear forces introduced into the component structure 10. For example, support portions 15 of the lattice-shaped component structure 10, which in a cross-sectional view located in the xz-plane lie in a crossing point of four partition walls, are uniformly distributed around the four cutouts 13, are formed with a greater supporting cross-section and hence a greater moment of resistance than the adjacent, intersecting partition walls 14. It hence is ensured that in the event of a (bending) force acting on the component 1 and its lattice-shaped component structure 10 along the z-direction, a plastic deformation does not lead to a shear fracture 121 in the support portion 15, but in an adjacent partition wall 14.

To specifically influence the fracture tendency of the partition wall 14 as well as the location and course of a fracture, waisting for example is provided approximately centrally on each partition wall 14, which approximately centrally leads to a reduced wall thickness and hence results in an indentation extending in the y-direction. On an area of reduced wall thickness, breaking points 14*a* and 14*b* are specifically defined in this way along the indentations for a shear fracture.

Furthermore, in order to support the formation of an energy-absorbing positive and/or non-positive connection and the entanglement of the structural parts 10*a*, 10*b* at the contact areas 120 and 12.1, 12.2 during the shearing of two structural parts 10*a* and 10*b* formed by shear fractures, which is described with FIGS. 1A to 1F, (cutout) lengths $l_2$—measured in the y-direction—of the cutouts 12 following each other in the y-direction are chosen greater than (wall) lengths $l_1$ of a partition wall 120 provided between two cutouts 12 in each case.

An angle α of a flank defined in the circumference of each hexagonal cutout 12 can also be used to control the extent to which, after a shear fracture, an additional and possibly repeated (at least two times) skipping of the parts of a fractured partition wall 120 having the shear surfaces 120.1 and 120.2 and of the second contact areas 12.1 and 12.2 defined by the cutouts 12 occurs. The (flank) angle α defines an inclination of a flank at a cutout 12 with respect to the spatial direction y, wherein this flank extends along an edge of the hexagonal basic shape of a cutout 12 shown in the yz-plane and opens at a breaking point 120*a* or 120*b*. Hence, on appearance of a shear fracture 121 a shear surface 120.1, 120.2 can slide into the opposite part of the adjacent cutout 12 along the corresponding flank.

When the second energy absorption mechanism is active via the interlocking structural parts 10*a*, 10*b* shearing off, an additional resistance force is added to a resistance force counteracting the deformation of the component 1 and applied by the support portions 15 due to the overlapping, interlocking structural parts 10*a*, 10*b*. In this way, the final strength at least temporarily is significantly increased until the failure crack V appears.

Figure 3:
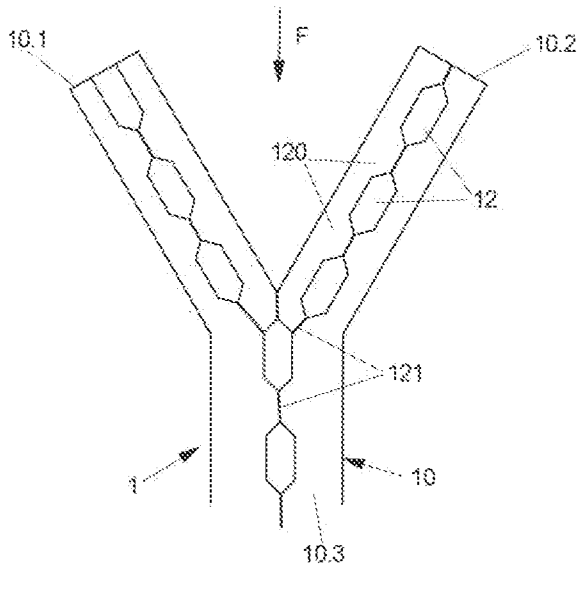
FIG. 3 sectionally and in a side view shows another design variant of a proposed component with a Y-shaped end portion formed by a lattice-shaped component structure.

The principle underlying the exemplary embodiments of FIGS. 1A to 1F ultimately is independent of the geometry of the component 1. For example, the proposed principle can also be used for a component 1 of FIG. 3. Here, the component 1 with a lattice-shaped component structure 10 is formed on an end portion that is Y-shaped in FIG. 3. The end portion of the component 1 hence has two component arms 10.1 and 10.2 extended at an angle to each other, which protrude from a common component base 10.3. Both in the component arms 10.1 and 10.2 and in the component base 10.3, successive cutouts 12 corresponding to the design variants of FIGS. 1A to 2B are provided along a respective direction of extension. On the partition walls 120 between these cutouts 12, (predetermined) breaking points 120*a*, 120*b* again are specifically provided for a defined crack formation and a defined crack growth. The design of the underlying lattice correspondingly is chosen such that shear fractures 121 are formed in the partition walls 120 in such a way that adjacent cutouts 12 thereby are connected to each other under plastic deformation of the component 1.

Figure 4:
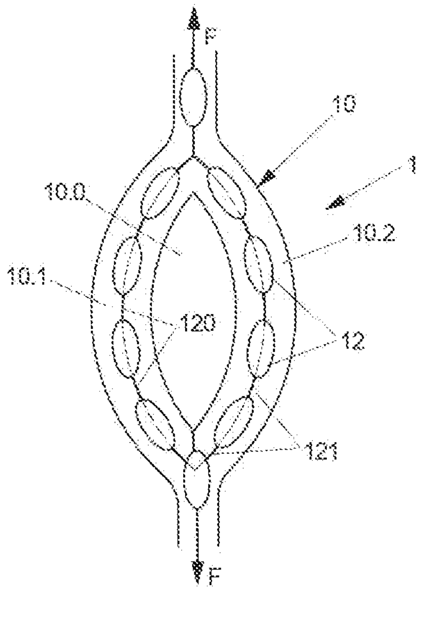
FIG. 4 sectionally shows another design variant of a proposed component with an O-shaped portion on which a lattice-shaped component structure is provided.

The same applies for a design variant corresponding to FIG. 4. Here, the component 1 by way of example is provided with an O-shaped component opening 10.0 which is circumferentially bordered by two mutually opposite component arms 10.1 and 10.2. These component arms 10.1, 10.2 as well as the adjoining areas of the component structure 10 of the component 1 also are each formed as a lattice with a plurality of cutouts 12 and with (web-shaped) partition walls 120 provided with breaking points 120*a*, 120*b*.

Figure 5A:
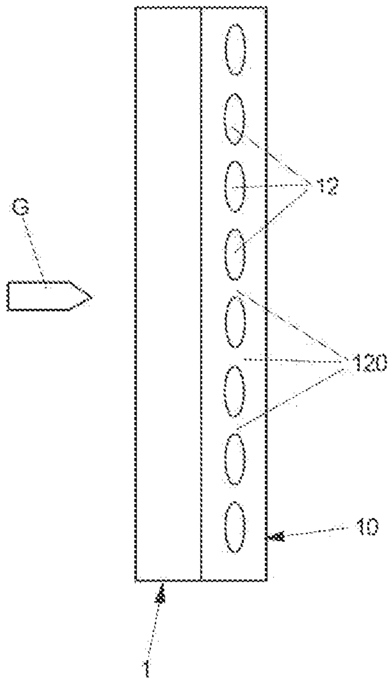
FIGS. 5A-5B show another design variant of a proposed component, which is configured as an armor steel plate with a lattice-shaped component structure, in two different phases on bombardment with a projectile.
Figure 5B:
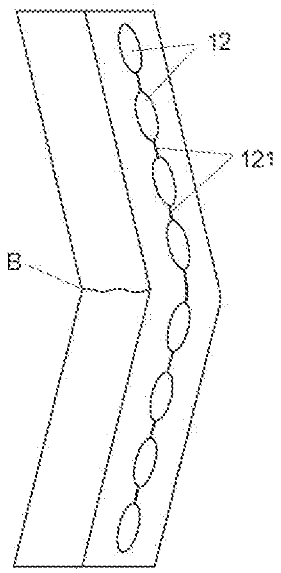
Figure 6A:
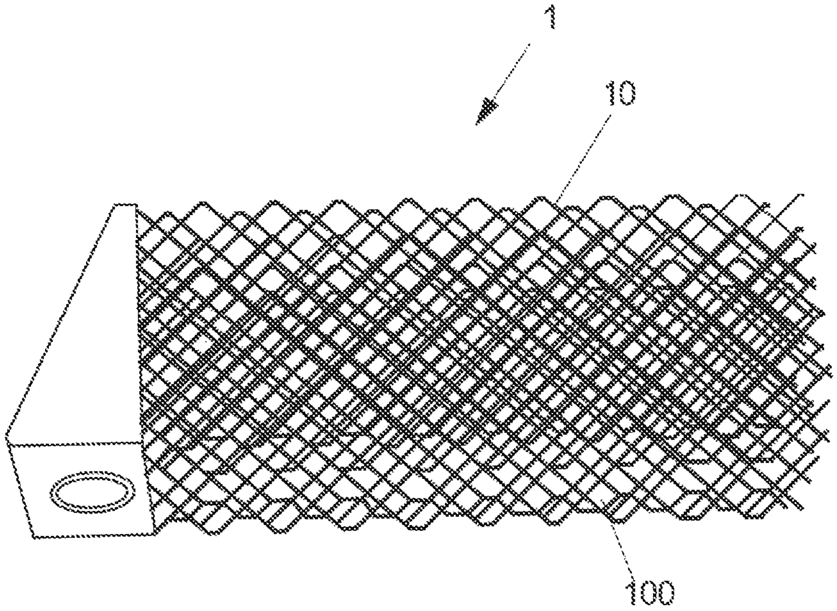
FIGS. 6A-6D each sectionally show a design variant of a proposed component with a lattice-shaped component structure made up of elementary cells, wherein in FIGS. 6A to 6D dimensions, web thicknesses and volumetric filling ratios of the elementary cells are varied so that the lattice-shaped component structures are designed for different force-path characteristic curves.
Figure 6B:
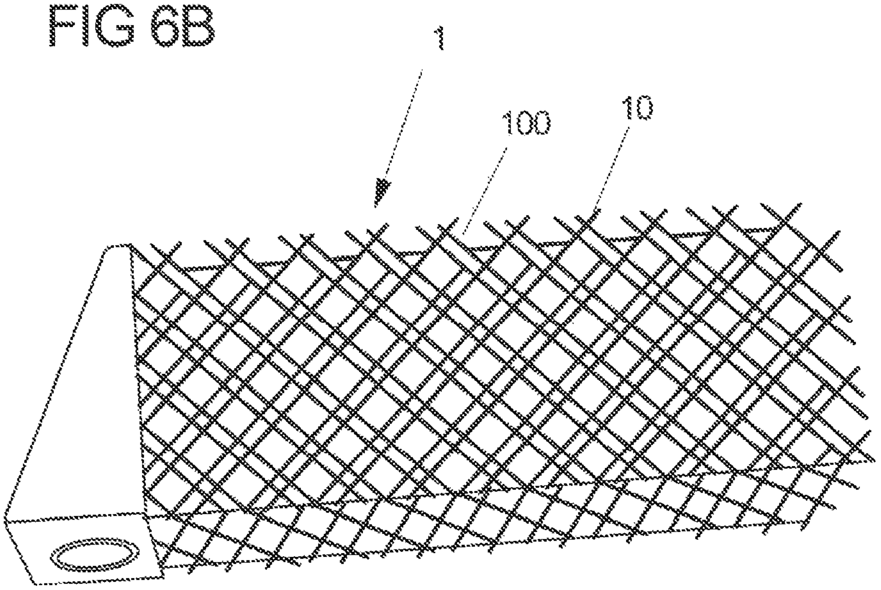
Figure 6C:
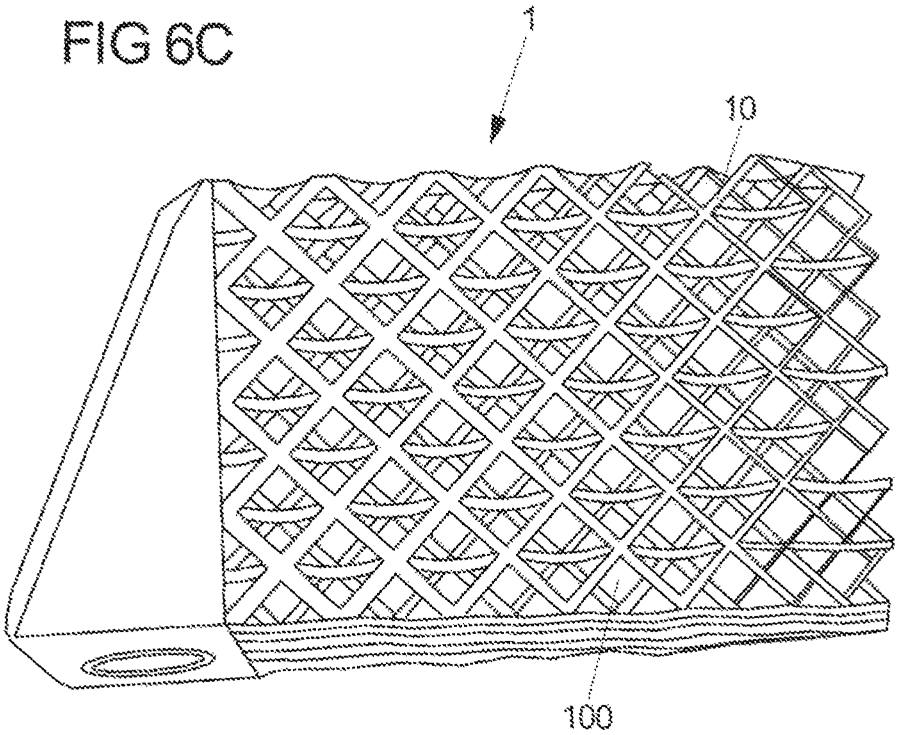
Figure 6D:
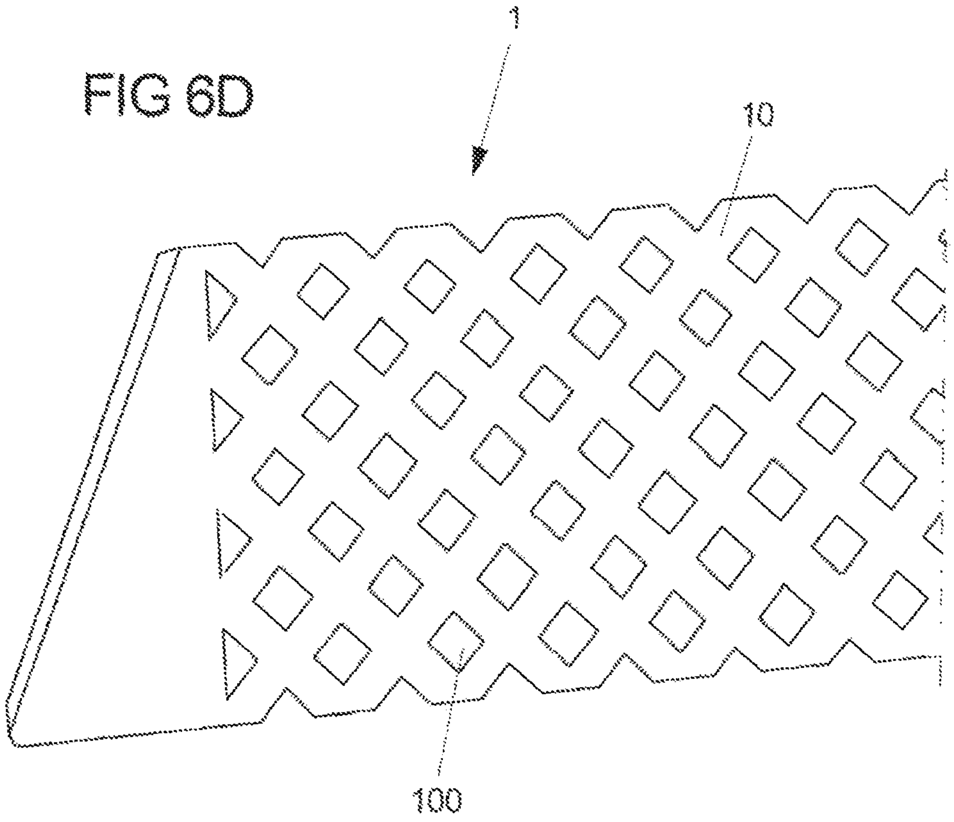

FIGS. 5A and 5B show the utilization of a component structure 10 in an energy-absorbing component 1, which is configured as an armor steel plate. Here, a force exceeding a threshold value acts on the component 1 via a projectile G. As a result of the force of the projectile G, the component 1 is plastically deformed at a bending or buckling point B. Again, as a result of the plastic deformation occurring along successive partition walls 120 and cutouts 12 of a lattice-shaped component structure 10, a multitude of energy-absorbing shear fractures 121 are permitted without complete failure of the component 1. Structural parts shearing off on each other and hence fragments of the component 1 continue to be held in place and the armor plate can withstand further bombardment.

FIGS. 6A, 6B, 6C and 6D show another exemplary embodiment of a component 1 with a differently designed lattice-shaped component structure 10. The component 1 here can integrate the energy absorption mechanisms explained in connection with FIGS. 1A to 5B. For a simplified and use-related adaptation of the lattice-shaped component structure 10 in connection with a design preceding the manufacture, the lattice-shaped component structure 10 is made up of lattices with identically designed elementary cells 100. Each elementary cell 100 originates from a reference cell 100R underlying all component structures of FIGS. 6A to 6D, which is varied merely in dependence on certain component parameters. In the final analysis, each component 1 of FIGS. 6A to 6D is adapted for different requirements merely via adaptations of the elementary cells and of a lattice formed therewith, without the dimensions of component 1 and its outer contour having to be different. In particular, by varying an elementary cell 100 and a lattice of the component structure 10 formed therewith, a simple design can be achieved on different characteristic curves.

Figure 7:
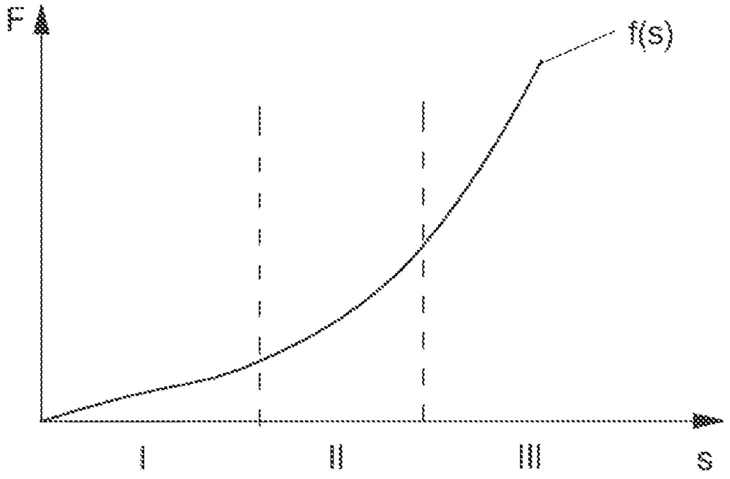
FIG. 7 shows a force-path diagram with an illustration of different characteristic curves for the design of a lattice-shaped component structure of FIGS. 6A to 6D.

A relevant characteristic curve with different areas here is shown with reference to FIG. 7. The characteristic curve f indicates the degree of a deformation s of a component 1 in dependence on a force F until failure. In different areas I, II and III the characteristic curve has different slopes. The individual areas I, II and III can correspond for example to the requirements for different utilization scenarios of a seat component formed with the component 1. The course of the characteristic curve in the area I is provided for a seat component typically carrying a child, the characteristic curve in the area II is provided for a seat component carrying a "lightweight" adult (50th percentile of the weight), and the characteristic curve in the area III is provided for a seat component carrying a "heavy" adult (95th percentile of the weight). Depending on the desired characteristic curve or characteristic curve area I, II, III, the lattice-shaped component structure 10 can be varied by varying the respective elementary cells 100 and hence can be adapted with regard to its energy absorption capacity, possibly by several orders of magnitude.

Figure 8:
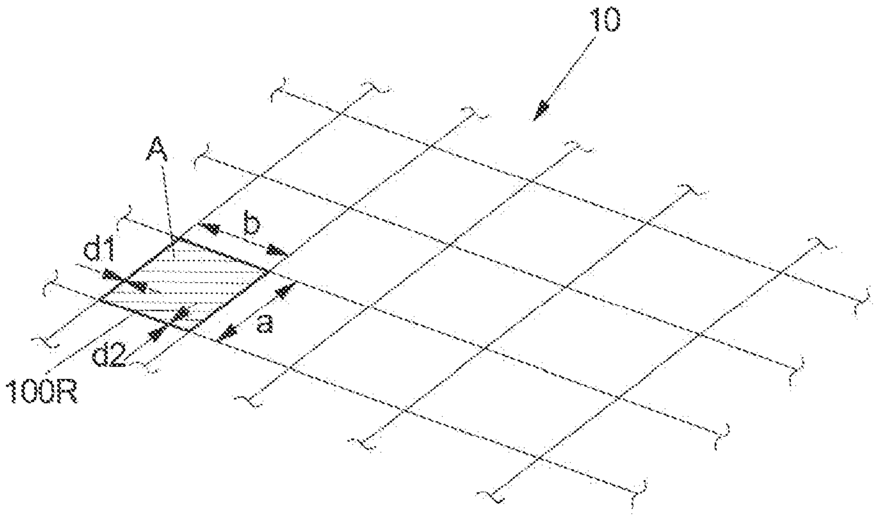
FIG. 8 sectionally shows a lattice-shaped component structure by highlighting a reference cell for the construction of the lattice-shaped component structure.

The lattice-shaped component structure here can be easily adapted and manufactured, e.g. additively, due to the geometry of the elementary cells 100, the thickness of the elementary cells 100 of a partition wall and a (volumetric) filling ratio. The starting point here for example is a reference cell 100R of a lattice-shaped component structure 10, which is shown by way of example in FIG. 8. This reference cell 100R has a cross-sectional area A, defined by edge lengths a, b. The adjacent webs have a web width or wall thickness d1 and d2. In particular the area A, the edge lengths a, b and the web widths d1, d2 can be varied in connection with a design in order to specify a lattice adapted to changed requirements and, on this basis, specify a lattice-shaped component structure 10. In particular, a simple modeling process can be used to specify a component 1 for different applications with a varied lattice structure 10 without having to vary the dimensions of the component 1 itself, i.e. in particular its required volume of installation space. Via an adaptation of the lattice-shaped component structure 10, however, for example the energy absorption capacity per volume or per kg weight of the component 1 can be varied. In particular, the lattice-based or reference cell-based design of the component 1 can take account of different design, installation space, weight, safety and performance requirements without having to significantly change the basic design of the component 1 and its outer contour. Merely one elementary cell 100 on which the respective lattice structure is to be based is varied on the basis of the predefined reference cell 100R.

In particular, the component can form different portions and hence zones that differ from each other with regard to the lattice taken as a basis for the lattice structure. Thus, at least two portions of the component each are formed in a lattice-shaped component structure, but here with differently designed lattices whose elementary cells 100 hence differ from each other in terms of their variation proceeding from the reference cell 100R.

The lattice-shaped component structures 10 of the illustrated design variants of FIGS. 1A to 8 in principle can be manufactured by means of additive manufacturing. The proposed solution, however, is not fixed on such a manufacturing method.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 component
10 component structure
10.0 component opening
10.1, 10.2 component arm
10.3 component base
100 elementary cell
100R reference cell
10*a*, 10*b* structural part
11 cutout (first type)
12 cutout (second type)
12.1, 12.2 second contact area
120 partition wall/first contact area
120.1, 120.2 shear surface
120*a*, 120*b* breaking point
121 (shear) fracture
13 cutout (third type)
14 partition wall
14*a*, 14*b* breaking point
15 support portion
A area
a, b edge length
B bending/buckling point
d1, d2 web width/wall thickness
F force
G projectile
L bearing
$l_1$, $l_2$ length
S shear force
V failure crack
α flank angle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A component configured for energy absorption in response to a force acting on the component, the component comprising:

a component structure integrating a first energy absorption mechanism and a second energy absorption mechanism, wherein the first and second energy absorption mechanisms are configured to be activated in response to the force acting on the component and the force exceeding a threshold value, wherein the first and the second energy absorption mechanisms activate in response to a plastic deformation of at least one portion of the component structure, wherein the component structure defines two cutouts, wherein the first energy absorption mechanism defines at least one breaking point within the component structure in a bordering area of the component structure formed between the two cutouts, so that, in response to the force exceeding the threshold value and acting on the component, a shear fracture propagates at the at least one breaking point and extends between the two cutouts to permit a connection of the two cutouts, wherein the second energy absorption mechanisms forms an energy-absorbing connection interface within the component structure in response to the force exceeding the threshold value, wherein the first energy absorption mechanism defines a first contact area including at least one of the breaking points for the shear fracture and configured to, in response to the force exceeding the threshold value and acting on the component, at least partially contact and engage with the energy-absorbing connection interface of the second energy absorption mechanisms, and wherein the first contact area is configured and dimensioned in such a way that in response to the force exceeding the threshold value, the at least one shear fracture forms in the first contact area and a shear fracture surface forms and protrudes with respect to an adjacent second contact area so that the shear fracture surface is brought into positive and/or non-positive contact with the second contact area in response to a continued force applied to the component.

2. The component of claim 1, wherein in response to the force acting on the component and the force exceeding the threshold value, the first and second energy absorption mechanisms are collectively configured to activate successively by means of the component structure, so that at least a portion of the energy introduced into the component via the acting force is absorbed via the first energy absorption mechanism before the second energy absorption mechanism is activated.

3. The component of claim 1, wherein at least one cutout of the two cutouts is elliptical, circular, hexagonal, honeycomb-shaped, or octagonal in cross-section.

4. The component of claim 1, wherein the energy-absorbing connection interface is formed by a second contact area at least partially recessed with respect to an adjacent area of the component structure, wherein the second contact area is configured to engage at least a portion of the first contact area in response to the force exceeding the threshold value and acting on the component and by at least one portion of the component plastically deforming.

5. The component of claim 1, wherein the second contact area includes a shell surface of a cutout.

6. The component of claim 5, wherein the first contact area is formed by a partition wall, disposed between two cutouts, extending along a spatial direction, and defining a wall length, wherein the wall length is less than a cutout length of each of the two cutouts extending along the spatial direction.

7. The component of claim 1, wherein the component structure is lattice-shaped.

8. A component configured for energy absorption in response to a force acting on the component, the component comprising:

a component structure integrating a first energy absorption mechanism and a second energy absorption mechanism, wherein the first and second energy absorption mechanisms are configured to be activated in response to the force acting on the component and the force exceeding a threshold value, wherein the second energy absorption mechanisms forms an energy-absorbing connection interface within the component structure in response to the force exceeding the threshold value and the first energy absorption mechanism defines a first contact area configured to at least partially contact the interface in response to the force exceeding the threshold value and acting on the component, wherein the energy-absorbing connection interface is formed by an at least partially recessed second contact area, wherein the second contact area is configured to engage at least a portion of the first contact area in response to the force exceeding the threshold value and acting on the component and by at least one portion of the component plastically deforming, and wherein the first contact area is configured and dimensioned in such a way that, in response to the force exceeding the threshold value, at least one shear fracture forms in the first contact area and a shear fracture surface forms and protrudes with respect to the adjacent second contact area so that the shear fracture surface is brought into contact with the second contact area in response to a continued force applied to the component.

9. The component of claim 8, wherein in response to the force acting on the component and the force exceeding the threshold value, the first and second energy absorption mechanisms are collectively configured to activate successively by means of the component structure, so that at least a portion of the energy introduced into the component via the acting force is absorbed via the first energy absorption mechanism before the second energy absorption mechanism is activated.

10. The component of claim 8, wherein the component structure defines two cutouts, wherein the first energy absorption mechanism defines at least one breaking point within the component structure in a bordering area of the component structure formed between the two cutouts, so that, in response to the force exceeding the threshold value and acting on the component, a shear fracture propagates at the at least one breaking point and extends between the two cutouts to permit a connection of the two cutouts.

11. The component of claim 10, wherein at least one cutout of the two cutouts is elliptical, circular, hexagonal, honeycomb-shaped, or octagonal in cross-section.

12. The component of claim 8, wherein the component structure is lattice-shaped.

13. The component of claim 12, wherein the lattice-shaped component structure extends along three mutually perpendicular spatial directions, wherein in cross-section and with respect to a first spatial direction and a second spatial direction of the three mutually perpendicular spatial directions, the component structure is formed by a lattice structure defining first cutouts arranged in a first pattern and second cutouts arranged in a second pattern, wherein the first pattern is different than the second pattern.

* * * * *